G. I. FRANCIS.
CYCLE PEDAL.
APPLICATION FILED JAN. 9, 1909.

955,957. Patented Apr. 26, 1910.

Witnesses.
M. H. Darg.
J. H. K. Boulter

Inventor.
Graham I. Francis,
per
Wm E. Boulter,
Attorney.

UNITED STATES PATENT OFFICE.

GRAHAM I. FRANCIS, OF COVENTRY, ENGLAND.

CYCLE-PEDAL.

955,957.  Specification of Letters Patent.  Patented Apr. 26, 1910.

Application filed January 9, 1909. Serial No. 471,528.

*To all whom it may concern:*

Be it known that I, GRAHAM INGLESBY FRANCIS, a subject of the King of Great Britain, residing at Coventry, in the county of Warwick, England, have invented certain Improvements in or Relating to Cycle-Pedals, of which the following is a specification.

This invention relates to cycle pedals and has for its object to provide an improved construction of cycle pedal of the type in which the body portion is easily detachable from the bearing portion without disturbing the bearings.

According to this invention, a central rotatable pedal bearing tube is used, as before, mounted upon the pedal pin, but the body is attached to the bearing tube at one extreme end only and is centered at the other end. For the purpose of attachment the inner end of the bearing tube may carry a flange for its fixing to the body, as by screws or otherwise.

Figure 1:
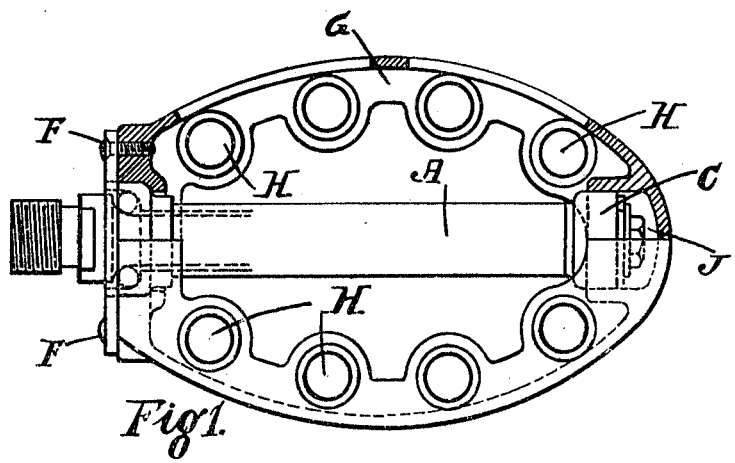
Figure 2:
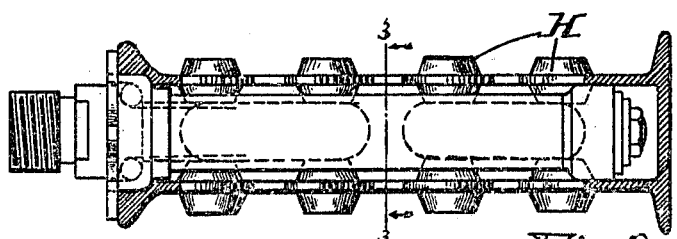
Figure 3:
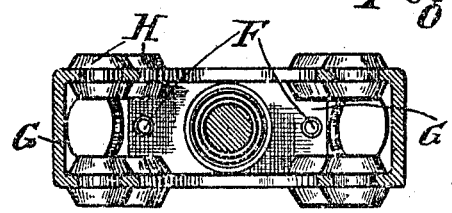
Figures 4, 5:
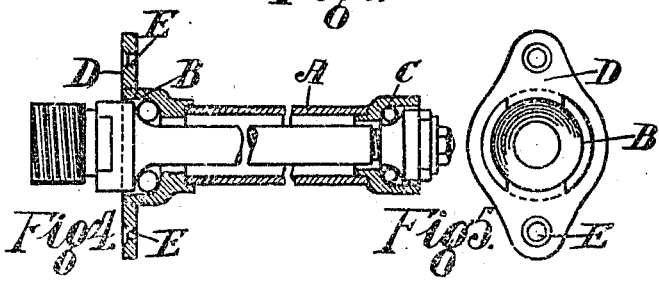

The accompanying drawings show one method of carrying out this invention. In these, Figure 1 is a part sectional plan view of a cycle pedal, Fig. 2 is a side elevation, Fig. 3 a transverse section on the line 3—3 of Fig. 2. Fig. 4 is a longitudinal section of the parts which remain in place after the pedal body is removed, and Fig. 5 is an end view of a detail.

Like letters indicate like parts throughout the drawings.

In this construction, the pedal bearing tube A is made of aluminum, dispensing with the necessity for plating and preventing any chance of rusting. The bearing cups B and C are attached to this tube in any convenient manner. The inner cup B is formed integral with, or has attached to it, a circumferentially-arranged plate or flange D. This is provided with screw holes E for the passage of screws F engaging the pedal body G. This latter is a casting or stamping of aluminum being of any suitable shape or design, and being in one piece and not built up as is usual. The pedal body may conform to the curvature of the foot and may be provided with teeth as in a rat-trap pedal, or with rubber studs or strips. In the construction illustrated reversible rubber studs H are shown.

The outer end of the pedal body is cast or otherwise provided with a recess J to slip over the outer pedal bearing so as to center this end of the pedal. The inner end of the pedal body comes flush up against the plate or flange and is attached to it by the screws F above mentioned.

It is found that a pedal constructed in accordance with this invention is very much lighter than a pedal of the ordinary type, while at the same time it is prevented from rusting, and the necessity for plating is to a great extent dispensed with.

The plate D is shown in Figs. 4 and 5 as being separate from the cup B but the two if preferred may be formed in one piece.

Obviously the pedal may be divided horizontally into two parts, being held together by set screws or the like.

What I claim as my invention, and desire to secure by Letters Patent, is:—

1. In combination, a bearing tube, bearing cups carried by said tube at the inner and outer ends of the latter, a circumferentially-arranged plate carried by the inner bearing cup, and a pedal body all in one piece abutting at one end against the said plate and having a recess at the opposite end fitting over the outer bearing cup, and means detachably securing the pedal body to the said plate.

2. In combination, a bearing tube, bearing cups carried by said tube at the inner and outer ends of the latter, a circumferentially arranged plate carried by the inner bearing cup, and a pedal body all in one piece abutting at one end against the said plate and having a recess at the opposite end fitting over the outer bearing cup, means detachably securing the pedal body to the said plate, and reversible rubber studs carried by said pedal body.

In testimony whereof I have signed my name to this specification in the presence of two subscribing witnesses.

GRAHAM I. FRANCIS.

Witnesses:
ERIC WALFORD,
JOHN T. FAZAKARLEY.